United States Patent [19]

Coibion et al.

[11] 4,053,687

[45] Oct. 11, 1977

[54] ELECTROCHEMICAL CELL

[75] Inventors: Jean Coibion, Tresses; Jean Lafaye, Carbon Blanc, both of France

[73] Assignee: SAFT-Societe des Accumulateurs Fixes et de Traction, Romainville, France

[21] Appl. No.: 731,773

[22] Filed: Oct. 12, 1976

[30] Foreign Application Priority Data

Oct. 17, 1975 France .............................. 75.31839
Oct. 17, 1975 France .............................. 75.31840

[51] Int. Cl.$^2$ .............................................. H01M 6/10
[52] U.S. Cl. ...................................... 429/94; 429/174; 429/178; 429/186
[58] Field of Search ................. 429/94, 164, 174, 178, 429/185, 186, 122, 208

[56] References Cited

U.S. PATENT DOCUMENTS

| 3,393,095 | 7/1968 | Philipp ................................. 429/94 |
| 3,650,842 | 3/1972 | Bourganan ........................... 429/94 |
| 3,732,124 | 5/1973 | Cailley ................................. 429/94 |
| 3,761,314 | 9/1973 | Cailley ................................. 429/94 |
| 3,775,182 | 11/1973 | Patton et al. ....................... 429/94 |

Primary Examiner—Anthony Skapars
Attorney, Agent, or Firm—Kenyon & Kenyon, Reilly, Carr & Chapin

[57] ABSTRACT

An electrochemical cell that has a compact block formed by an assembly of first and second electrodes of opposite polarity separated by separator means. The block is housed in a container having a base and a cover. The rim of the container is turned down over the periphery of the cover to seal off the container contents. The borders of the first electrode project from opposite ends of the block and bear against the base and the cover. The invention is particularly applicable to a cylindrical cell having a spirally wound electrode block.

22 Claims, 12 Drawing Figures

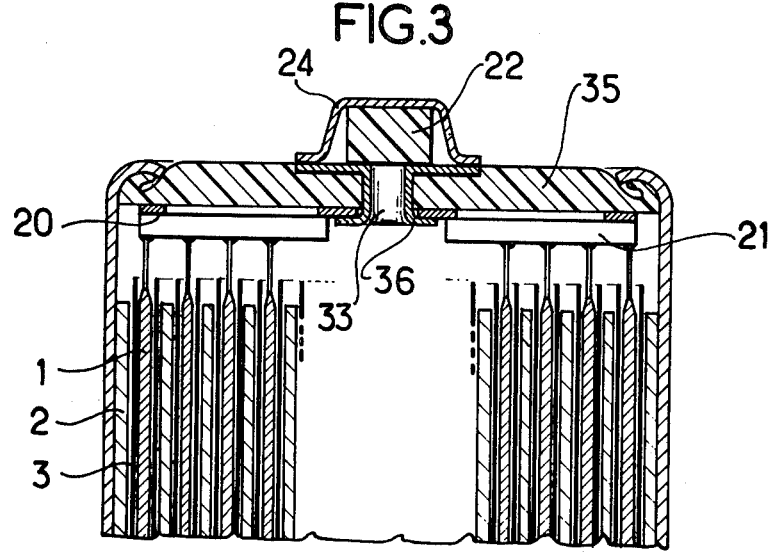
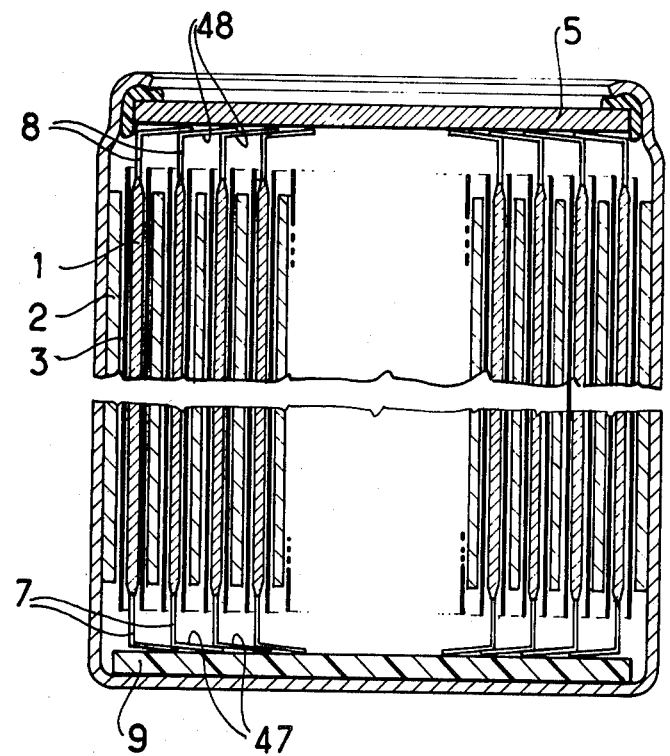

4,053,687

ELECTROCHEMICAL CELL

BRIEF SUMMARY OF INVENTION

The present invention relates to electric cells whose electrodes and separator form a compact block. It applies particularly, but not exclusively, to cylindrical cells in which the block is spirally wound.

Such cells generally have a casing constituted by a metal container in the form of a can closed by a cover, the rim of the can being turned down over the periphery of the cover to seal off the contents within the can. The cover can be of metal, in which case its periphery is embedded in a sealing ring of plastic material or elastomer, or else the cover can be of plastic material. In order that a sealed closure can thus be provided, the cover must have a firm and stable support. This support is usually supplied by a shoulder on the interior of the can, obtained by a profiling operation which consists in locally indenting the wall of the can forming an annular groove in its exterior surface.

It is desirable to dispense with this profiling operation, which complicates the assembly of cells and which is a critical operation, in that if it is not properly done, there is a danger of its leading to perforation of the can, either directly or indirectly by setting up mechanical stress which leads to corrosion by the electrolyte.

British Pat. No. 1,332,944 of June 18, 1971 and U.S. Pat. No. 3,761,314 of Sept. 25, 1973, both incorporated by reference herein, disclose an electric cell in which the borders of the electrodes of both polarities project respectively from opposite ends of the block and are folded substantially at right angles to form support surfaces.

In such a cell, if excessive force is exerted on the electrode borders in the longitudinal direction of the block, the block is in danger of collapsing because of the electrodes sliding over each other.

An aim of the present invention is to remedy this drawback.

Also preferred embodiments improve and simplify the connecting of the electrodes to cell terminals.

The present invention provides an electric cell comprising a compact block formed by an assembly of a first electrode having a first polarity, a second electrode having the opposite polarity and separator means between the electrode housed in a casing formed by a metal container with a closed base and a rimmed upper end which is closed by a cover, the rim of the container being turned down over the periphery of the cover, wherein the borders of the first electrode project from the opposite ends of the block and provide supports which bear respectively against the base of the container and against the cover.

The support surfaces thus created and provided by the said supports enable the electrode block to withstand the force applied during the sealing closure of the cell without any danger of collapse by sliding of electrodes. The support surfaces can be formed by the outer edges of the electrode borders.

Alternatively, the electrode borders can be folded substantially at right-angles, as described in British Pat. No. 1,332,944 of June 18, 1971, and U.S. Pat. No. 3,761,314 of Sept. 25, 1973 to form bearing surfaces.

The force exerted by the cover on the borders of the first electrode can also be used for effecting the electrical connection to this electrode to provide a first cell terminal. To this end, provided the cover is metallic and intended to constitute the terminal of the first polarity, an insulating sealing ring is required which surrounds the periphery of the cover and separates it from the rimmed edge of the container. The cover then may be in direct contact with the said electrode borders. It can additionally be soldered or welded thereto. Alternatively, the electrode borders can be in contact with a connection part which is in turn soldered or welded to the cover.

When the cover is of electrically insulating material, the electrode borders can also be in contact with a metallic connection part soldered or welded to a terminal which passes through the cover the connection part can also be soldered or welded to the borders of the electrode.

The connection part, whether or not it is fastened to the electrode borders by soldering or welding, may have edges which are folded to project towards the block a described in French Pat. No. 70,24,413 of July 1970, published uder the number 2,097,301 and in U.S. Pat. No. 3,732,124 of May 3, 1973.

As for the second polarity terminal of the cell, it can be made in several different ways: if the metal container of the storage cell is in direct contact with the second electrode, e.g., by its side wall, it can constitute the second polarity terminal: alternatively, according to one particularly advantageous embodiment, applicable to electric cells having spirally wound electrodes, one end of the second electrode is electrically connected by soldering, welding, rivetting or any other means to a central metal core around which the electrodes are spirally wound.

One end of the metal core may be in contact with the container which then constitutes the second polarity terminal.

Alternatively one end of the core may pass through the container cover of the electric cell to form the second polarity terminal.

If the core passes through the cover of the container, the bushing it passes through can also operate as a valve by having an annular lip pressing resiliently on the lateral surface of the core.

Other objects and features of the invention will become apparent from the following description wherein a few embodiments are described by way of example with reference to the accompanying drawings, in which:

FIG. 2b shows in perspective a connection part pertaining to the electric cell of FIG. 2a;

Figure 5:
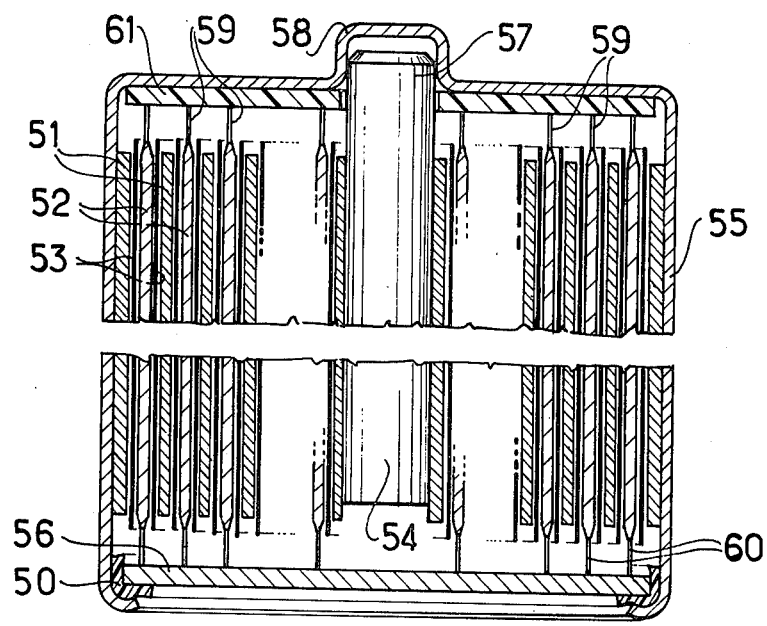
Figure 6:
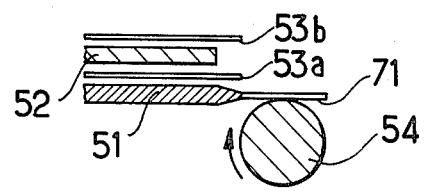
Figure 7A:
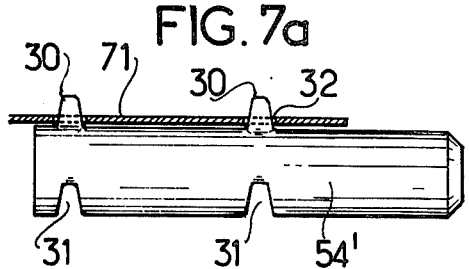
Figure 7B:
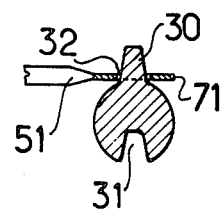
Figure 7C:
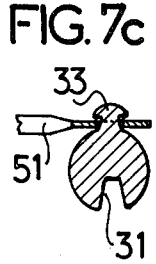
Figure 8:
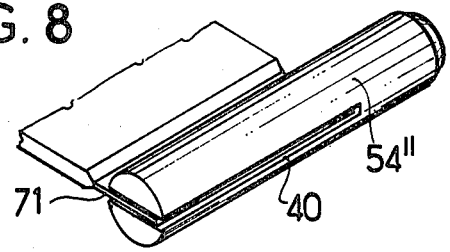
Figure 9:
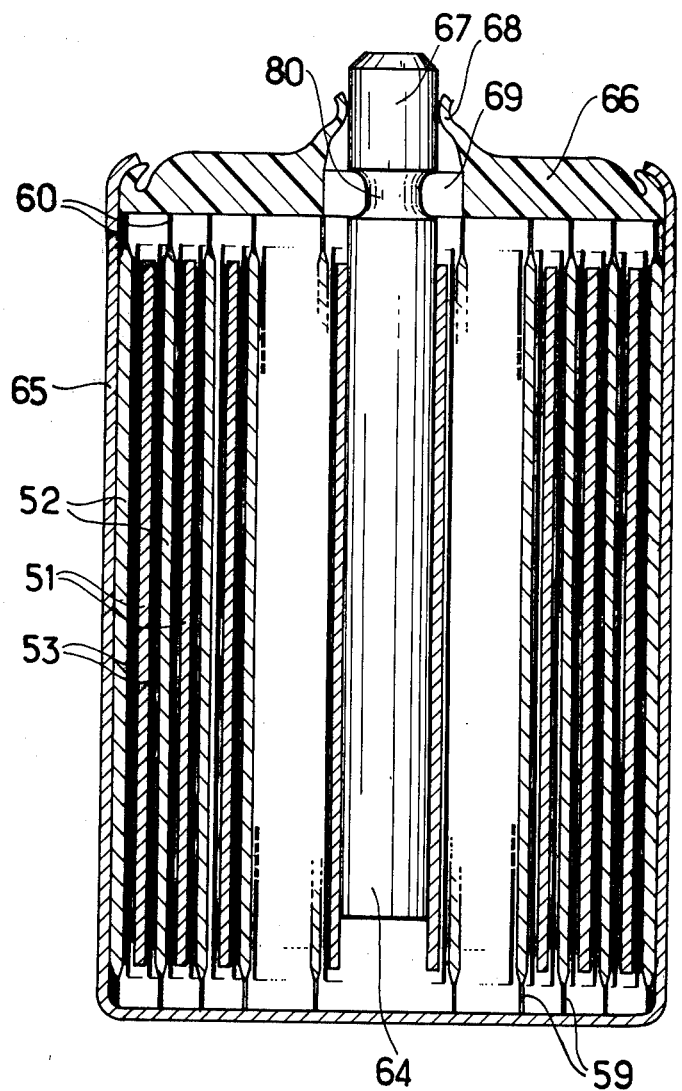

FIGS. 3 and 4 respectively are partial diagrammatic cross-sections of third and fourth embodiments of the invention;

FIG. 5 is a diagrammatic cross-section of an embodiment of an electric cell in which the electrodes are wound around a central metal core;

FIG. 6 is a diagrammatic transversal cross-section of the core and the ends of the electrodes and of the separator of the electric cell of FIG. 5 before winding;

FIG. 7a is a diagrammatic cross-section of assembly operation of the electric cell of FIG. 5, showing the core and the end of a positive electrode before winding, the negative electrode and the separator not being shown;

FIGS. 7b and 7c are transversal cross-sections similar to those of FIG. 6, relating to two phases in the assembly of the embodiment of FIG. 7a;

FIG. 8 shows in perspective the core and the end of a positive electrode before winding of another embodiment; and FIG. 9 is a diagrammatic cross-section of another embodiment of an electric cell with the insulating cover and the metal central core forming a valve with the cover.

DETAILED DESCRIPTION

Figure 1:
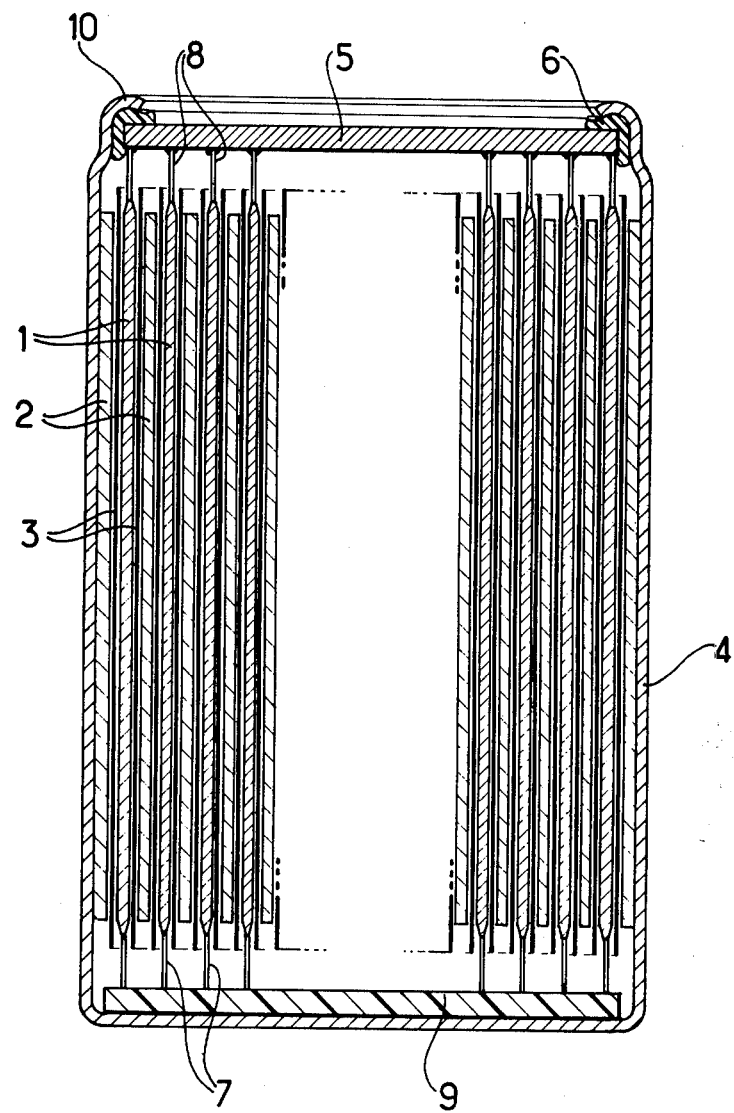
FIG. 1 is a diagrammatic cross-section of a first embodiment of a storage cell according to the invention having a metal container and metal cover.

The storage cell of FIG. 1 comprises a compact block formed by a sandwiched assembly of a positive electrode 1 and a negative electrode 2 separated by separator means 3, wound in a spiral and placed in a casing formed by a metal container 4 and a metal cover 5 in the shape of a disk, insulated from each other by a sealing ring 6.

Edge portions or borders 7 and 8 of the positive electrode 1 project respectively from the two ends of the block, the outer edge of the border 7 bears against the base of the container via an interposed resilient insulating sheet 9, while the outer edge of the border 8 bears directly against the cover 5.

The rim of the container 4 is turned down over the periphery of the cover 5, compressing the interposed sealing ring 6 which surrounds the periphery of cover 5. Since opposite borders of the same electrode 1 respectively bear against the cover 5 and the bottom of the container 4 via sheet 9 the electrode block is able, without collasping to withstand the pressure exerted by the rim 10 turned down over the cover 5. This pressure also provides good electric contact between the upper electrode border 8 and the metallic cover 5, which constitutes the positive terminal of the storage cell. This contact can be further improved by integration as by electric welding or soldering of ends of the border 8 to cover 5. The sheet 9 insulates the lower electrode border 7 from the base of the container 4. The side wall of the container 4 is in contact with the outer spiral of the negative electrode 2 and thus constitutes the negative terminal of the electric cell. The elasticity of the sheet 9 protects the electrode borders 7 and 8 from damage during assembly of the electric cell. This sheet 9 could also be rigid, but this would entail greater care during assembly.

The electrodes 1 and 2 are constituted, for example, by a conductive carrier such as a nickel plated steel sheet, covered with a layer of sintered metal impregnated with active material, the borders 7 and 8 of the positive electrode being those of the conductive carrier which is uncoated there.

Figure 2A:
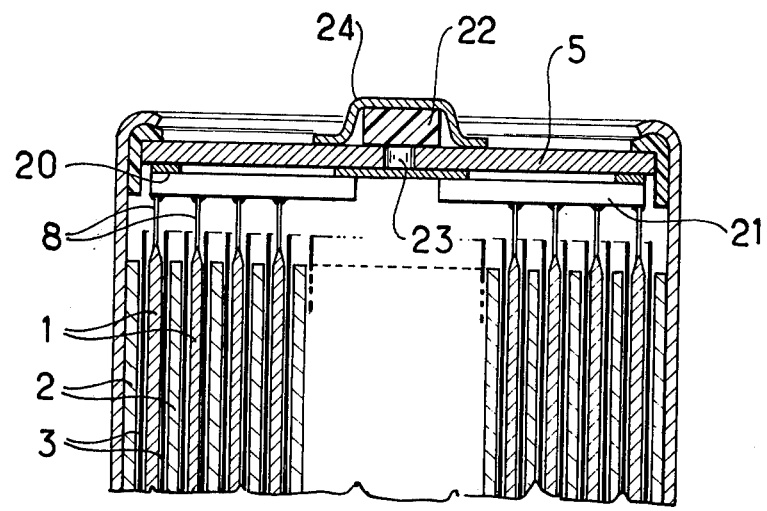
FIG. 2a is a partial diagrammatic cross-section of a second embodiment having a metal container and metal cover.
Figure 2B:
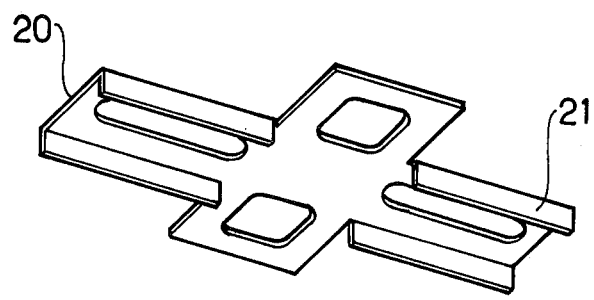

In FIG. 2a, the same references as in FIG. 1 are used to designate identical elements. The metal cover 5 of the electric cell which is shown therein bears on the border 8 of the positive electrode 1 via an interposed metal connection part 20 (cf. FIG. 2b). The connection part 20 is welded to the cover 5 and has edges 21 which are folded to extend inwardly towards the block, in the manner described in the above-mentioned French Pat. No. 2,097,301 U.S. Pat. No. 3,732,124. The edges 21 are preferably welded to the electrode border 8. The electric cell has a valve formed by an elastomer pellet 22 stopping an orifice 23 in the cover 5 and held in place by a cap 24 welded to the cover 5.

The electric cell in FIG. 3 has elements which are common to those in FIGS. 1 and 2, designated by the same reference numerals. The metal cover 5 in the previous examples is here replaced by a plastic cover 35 traversed by a valve terminal as described in French Pat. No. 73 28 850 of Aug. 7, 1973 published under No. 2,240,389. This valve terminal is formed by a hollow metal rivet 36 mounted in cover 35. An elastomer pellet 22 stops the orifice 33 of rivet 36 and a metal cap 24 welded to the head of the rivet serves to hold the pellet 22 in place. The rivet 36 is crimped to a metal connection part 20. The border 8 of the positive electrode 1 is in electrical connection with part 20. The cap 24 serves as one terminal of the cell. The outer spiral of negative electrode 2 is in contact with the inner face of metal container 4 and the latter serves as the other cell electrode.

The electric cell shown in FIG. 4 differs from that of FIG. 1 in that tabs respectively 47 and 48 which are folded substantially at right angles to form support surfaces are cut from the electrode borders 7 and 8 of the positive electrode 1, as is described in British Pat. No. 1,332,944 and in U.S. Pat. No. 3,761,314. These support surfaces are resilient so there is no assembly disadvantages if in this case the insulating sheet 9 is rigid.

Various changes may be made to the preceding embodiments. More especially, the connection part 20 with folded edges used in the embodiments of FIGS. 2 and 3 can be replaced by a different type of connection part, e.g., one of those described in French Pat. Nos. 1,415,519 of July 18, 1963, 1,510,827 of Apr. 1, 1966, 71 85 029 of Sept. 21, 1971, published under No. 2,154,904, British Pat. No. 1,177,852 of Feb. 16, 1967, U.S. Pat. Nos. 3,505,121 of Apr. 7, 1970, and 3,650,842 of Mar. 1, 1972, British Pat. No. 2,358,335 of Sept. 27, 1972, U.S. Pat. No. 3,837,925 of Sept. 24, 1974, British Pat. No. 1,365,242 of Oct. 19, 1972 and French Pat. No. 71 38 821 of Oct. 28, 1971 published under No. 2,158,692, all incorporated by reference herein. A similar connection part can also be interposed between the cover 5 and the electrode border 8 of the electric cell shown in FIG. 4.

The components above described as being welded together could be soldered together. The description of the valve terminal in FIG. 3 also does not have any limiting character. This element can be replaced by a terminal of a different type, which need not necessarily provide the valve.

Further, one of the electrode borders 7 and 8 of the positive electrode can be folded as shown in FIG. 4 while the other provides a bearing surface with its outer edge as shown, e.g., in FIG. 1.

The polarities of the respective electrodes can be interchanged.

The various embodiments which have just been described are applied to electric cells with spirally wound electrodes. These embodiments can readily and naturally be transposed to electric cells having plane electrodes stacked in a prismatic casing. The following embodiments, on the contrary, relate only to electric cells with spiral electrodes.

Thus, the electric cell shown in FIG. 5 comprises a compact block formed by a sandwiched assembly of a positive electrode 51 and a negative electode 52 separated by separator means 53, spirally wound round a metal core 54 and placed in a casing formed by a metal container 55 and a metal lid 56, insulated from each other by a sealing ring 50. One end 57 of the core 54 is in contact with a swaged part 58 of the closed end of container 55, which constitutes the positive terminal of the electric cell. The core end 57 can be force fitted into the part 58 and soldered or welded in place.

Bare metallic borders 59 and 60 of the negative electrode 52 project respectively from both ends of the block. The outer edge of the upper electrode border 59 bears against the base of the container 55 via a resilient insulating washer 61, whereas the outer edge of the lower electrode border 60 bears directly against the lid or cover 56. The disposition shown in this figure could be modified so that the container and the cover form respectively the negative and positive terminals of the electric cell. The cover would then be in contact with the core and insulated from the border of the negative electrode, while the container would be in contact with the border of the negative electrode and the outer spiral of the latter. Insulation between the container and the cover and between the electrode border and the cover could then be provided by a single part. Further, the element of the casing in contact with the core would not have a swaged part analogous to 58 but would have a plane surface in contact with the end of the core.

The electric connection between the positive electrode 51 and the core 54 can be provided by various means, some of which will now be described.

FIG. 6 is a transversal cross-section of the core 54 and the inner-most ends of the electrodes 51 and 52 and of the separator means 53 before winding. The end of the positive electrode 51 has a bare metal portion 71 lacking active material. This portion is part for example of a conductive carrier, which can be nickel-plated steel sheet, covered also except for this portion 71 with a layer of sintered metal impregnated wtih active material. The bare portion 71 is spot welded to the core 54. A first strip of separator 53a, the negative electrode 52 and a second separator strip 53 b are successively stacked on the electrode 51, the end of the electrode 52 being recessed between the ends of the separator strips. If the core 54 is rotated in the direction of the arrow, the electrodes and the separators wind around it and form a spiral in which the negative electrode is insulated by the separator means from the positive electrode and from the core 54, which forms a connection for the positive electrode.

In the embodiment in FIGS. 7a to 7c, the core 54' has studs 30 formed by displacement of metal by means of a tool which leaves corresponding hollows 31. The bare portion 71 of the positive electrode has apertures 32 in which the studs 30 are engaged, then the studs 30 are deformed into rivet heads 33 to provide good electric connection.

The negative electrode and the separator can be disposed as in FIG. 6 and the assembly can be wound in the same way.

In the embodiments which have just been described, the bare portion 71 of the positive electrode is in the form of a strip parallel to the inside edge of the electrode. The same connection means can be applied to a bare portion formed by strips perpendicular to the inside edge.

In a variant according to FIG. 8, the core 54" has alongitudinal slot 40, in which the bare end of portion 71 of the positive electrode is inserted as in the slot of a sardine can opener. It can also be soldered or welded to the walls of the slot.

In the embodiment of an electric cell shown in FIG. 9, the borders 59 of the electrodes 52 are in direct contact with the bottom of the metal container which forms the terminal of the first polarity of the electric cell, the current output of the opposite polarity being provided by the central core.

In the figure, references are taken from FIG. 5 to designate identical elements. The casing is formed by a metal container 65 and a plastic cover 66. A metal core 64 is in electrical contact with the inner end of the positive electrode 51 and provides a connection for the latter. One end 67 of the core 64 passes outwardly through the insulative plastic over 66 and forms the positive terminal of the electric cell. An annular lip 68 of the cover bears resiliently on the lateral surface of the core 64, forming a valve for the venting of gases evolved in the electric cell. The cover also has spaced studs 69 which are four in number for example and which engage in an annular groove 80 formed in the core to ensure axial fixing of the core relative to the electrode block. The venting of the gases remains possible along the core in space provided between the studs. The outer spiral of the negative electrode 52 is in contact with the lateral wall of the container 65, which forms the negative terminal of the electric cell.

As in FIG. 5, borders 59 and 60 of the negative electrode 52 project respectively at both ends of the block. The border 59 bears directly and in electrical contact against the bottom of the can 65, which forms the negative electrode of the electric cell, whereas the cover 66 bears against the outer edge of the border 60. The system for immobilizing the core 64 by studs 69 and the groove 80 is not indispensable, unless the electric cell is to be subjected to large mechanical forces or prolonged vibration.

The invention is not limited to the preceding examples. Thus, at least one of the electrode borders could be split and turned down at right angles as disclosed in the said British Pat. No. 1,332,944 and U.S. Pat. No. 3,761,314.

The polarities of the electric cell could also be interchanged, the core being connected to the negative electrode.

All patents specifically referred to herein are incorporated by reference.

The welding of soldering of components as described herein effects integration of the so-joined components and effective electrical connections therebetween.

It is to be understood that variations within the scope of the appended claims are possible and are contemplated. There is not intention therefore of limitation to the exact disclosure herein presented.

What is claimed is:

1. An electrochemical cell comprising a metal container having a closed base, an open upper end having a rim, a cover, means for effecting a seal between the container and cover, and a compact block positioned within said container comprising an assembly of electrodes of opposite polarity and separator means between such electrodes, one of said electrodes having conductive borders respectively projecting outwardly from opposite ends of said block, said borders resepctively bearing against the cover and base of said container, said borders providing supports for said block between the cover and base of said container.

2. An electric cell according to claim 1, wherein at least one of the said supports is provided by the outer edge of one of the electrode borders.

3. An electric cell according to claim 1, wherein at least one of the electrode borders is folded substantially at right-angles to the rest of the electrode to serve as one of said supports.

4. An electric cell according to claim 1, wherein the cover is made of metal and forms a terminal of first polarity of the cell, and including an insulating and sealing ring interposed between said cover and rim.

5. An electric cell according to claim 1, wherein the cover is metallic and in direct contact with one of the projecting borders.

6. An electric cell according to claim 5, wherein the metallic cover is integrated with the said one of the borders.

7. An electric cell according to claim 1, wherein the cover is of electrically insulating material and includes a terminal of first polarity for the electric cell passing through it.

8. An electric cell according to claim 4, including a metallic connection part electrically connecting the said terminal to one of the projecting borders of said one of the electrodes of said block.

9. An electric cell according to claim 8, wherein the connection part includes a generally plane portion with edges folded in the direction of the block.

10. An electric cell according to claim 8, wherein the connection part is integrated with said one of the borders.

11. An electric cell according to claim 8, wherein the connection part is integrated with the terminal.

12. An electric cell according to claim 1, wherein said last named means comprises an insulating sheet interposed between the projecting border adjacent the base of the container.

13. An electric cell according to claim 12, wherein the sheet is resilient.

14. An electric cell according to claim 1 including a central conductive core and wherein the electrodes are spirally wound around said conductive core, said core being in contact with an end of another one of said electrodes and providing an electrical connection for the latter.

15. An electric cell according to claim 14, wherein one end of the core is in contact with the container which forms a terminal of second polarity of the electric cell.

16. An electric cell according to claim 14, wherein one end of the core passes through the container and forms a terminal of second polarity of the electric cell.

17. An electric cell according to claim 14, wherein one end of the core passes through the cover and forms a terminal of second polarity of the electric cell.

18. An electric cell according to claim 14, wherein one end of the core is in contact with the cover which forms a terminal of second polarity of the electric cell.

19. An electric cell according to claim 17, wherein the cover has an annular lip bearing resiliently on the lateral surface of the core to form a valve.

20. An electric cell according to claim 14, wherein the said end is spot welded to the core.

21. An electric cell according to claim 14, said core has a longitudinal slot, the said end being inserted in said longitudinal slot of the core.

22. An electric cell according to claim 14, wherein the said end is fixed to the core by rivetting.

* * * * *